Dec. 13, 1955  L. SCHINDEL  2,726,577
MILITARY TANKS
Filed Nov. 22, 1952
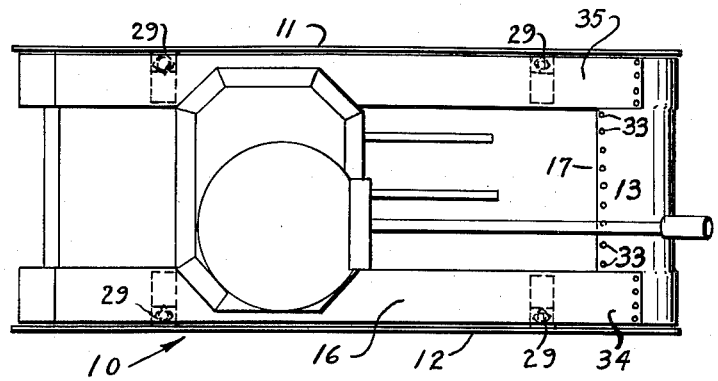
Fig. 1
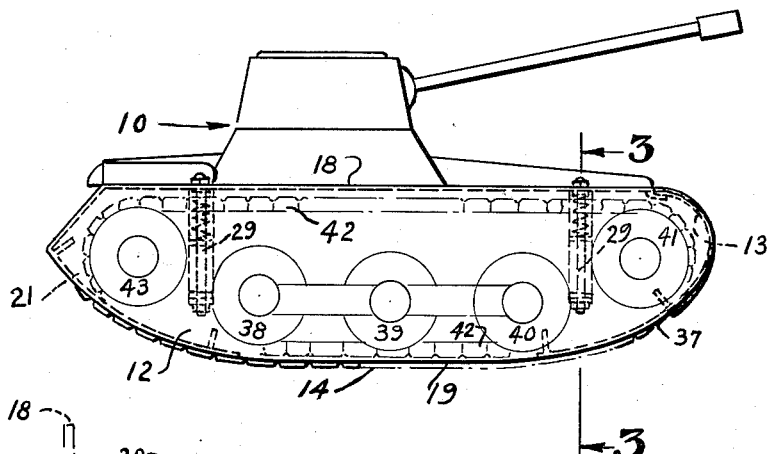
Fig. 2
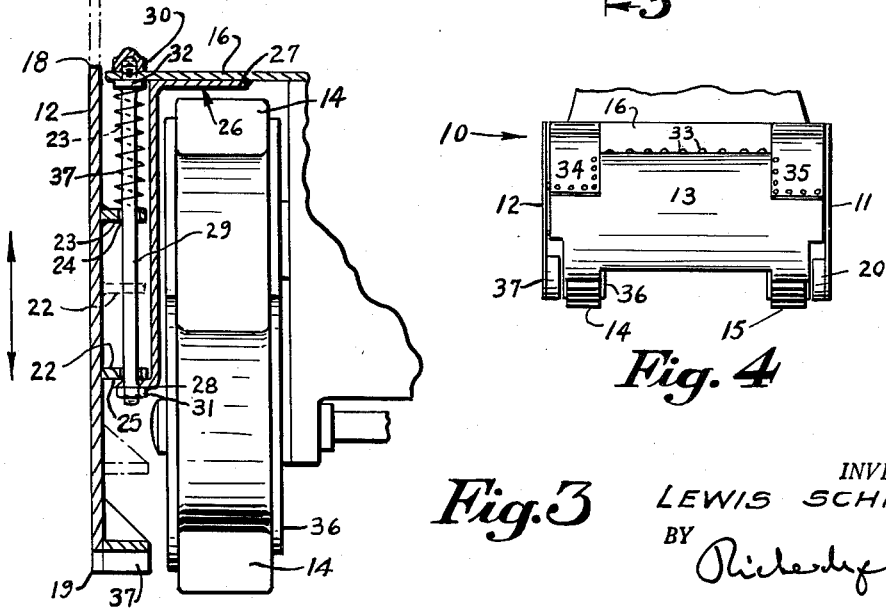
Fig. 3
Fig. 4
INVENTOR.
LEWIS SCHINDEL
BY Richard Geier
ATTORNEYS

United States Patent Office 2,726,577
Patented Dec. 13, 1955

2,726,577

MILITARY TANKS

Lewis Schindel, Great Neck, N. Y.

Application November 22, 1952, Serial No. 321,973

2 Claims. (Cl. 89—36)

This invention relates to improvements in vehicles and, more particularly, to improvements in military tanks having armored bodies.

It is an object of the instant invention to provide greater protection for military tanks.

Another object is to disclose protection of such a nature that the maneuverability of the tank is substantially unimpaired.

Other objects of the instant invention will become apparent in the course of the following specification.

In the attainment of the aforesaid objectives, a side shield which may be stationary or vertically movable is secured to each side of the tank or armored vehicle in outwardly spaced arrangement with the side of the wheels or the Caterpillar treads. As the tank moves over terrain sufficiently rough for tilting, the bottoms of the side shields in contact with the terrain will force the shields upwardly to permit the free movement of the treads and tank. A stationary front shield is secured to the armored body at the front and extended along a curvilinear line downwardly and forwardly in spaced arrangement with the front of the treads on both sides of the armored body to provide protection for the front of the treads.

The invention will appear more clearly from the following detailed description when taken in conjunction with the accompanying drawings showing by way of example a preferred embodiment of the inventive concept.

In the drawings:

Figure 1 is a plan view of the improved tank constructed in accordance with the principles of this invention;

Figure 2 is a side elevational view of the tank shown in Figure 1;

Figure 3 is a fragmentary vertical view along 3—3 of Figure 2 but on an enlarged scale; and Figure 4 is a front view of the tank shown in Figure 1.

Referring now in greater detail to the drawings where like reference numerals indicate like parts, reference numeral 10 indicates the tank, 11 and 12 the vertically movable side shields, and 13 the stationary front shield.

The tank 10 is of known type having along the sides the Caterpillar treads 14 and 15 which are also well known and operate as an endless chain around a series of rotatably mounted wheels in spaced arrangement in the same plane. One of the wheels is indicated by the reference numeral 36 (Fig. 3). However, the wheels operating the treads are not to be confused with the painted representations of wheels on the later described side shields, as illustrated in Figure 2 and described later.

The deck 16 overhangs the treads along both sides (Fig. 3) of the tank, but terminates interiorly of the treads at the front substantially along the line 17 (Fig. 1) between the mud guards 34 and 35.

Each vertically movable side shield 11 and 12 is similar and is made of armored material. Each side shield at the top has a linear edge 18 subtended by an arcuate edge 19, the contour of which corresponds substantially to the bottom and ends of the tread as viewed from the side. Over relatively level terrain, the linear edge 18 is in juxtaposition with the corresponding outer edge of the deck when the shield substantially conceals the treads as shown in Figures 2 and 3. Thus, each side shield is slidable against and above the corresponding edge of the deck when one end of the tank is tilted substantially out of the horizontal position as later shown.

Adjacent each end of each side shield and the bottom edge thereof, are the similar shoes 37, 20, and 21 with one of the shoes on the side of the tank opposite the shoe 21 not shown in the drawings. Any suitable means may be used for attaching the shoes which are preferably inwardly directed, as most clearly shown in Figure 3.

Each side shield 11 and 12 is made vertically movable in outwardly spaced arrangement with the side of the treads in the following manner: Two vertically spaced flanges 22 and 23 are fastened by welding or other suitable means to the inner surface of the side shield adjacent each end and inwardly directed therefrom. Through each pair of flanges is a pair of vertically aligned openings 24 and 25 (Fig. 3). For the support of each pair of flanges, a bracket with an inwardly directed top portion 27 and an outwardly directed bottom portion 28 is provided. The inwardly directed top portion 27 of the bracket is fastened by any suitable means to the bottom of the overhanging deck as most clearly seen in Figure 3 and in such a position that the outer end extremity of the bottom portion 28 is in back of a vertical plane tangent to the corresponding outer edge of the deck 16. Aligned and vertically directed openings are made in the overhanging deck and the bottom portion 28 of the bracket and through the aligned openings a guide rod 29 is inserted. The ends of the rod are threaded so that it can be securely fastened in position by the nuts 30 and 31, the nut 30 against the top of the deck and the nut 31 against the bottom of the bottom portion 28 of the bracket. By placing the flange 22 on the top of the bottom portion 28 and aligning the openings, the guide rod 29 is also slidably inserted through the openings in the flanges 22 and 23 with the top of the plate tangent to the outer periphery of the deck 16 when the flange 22 rests on the bottom portion 28 of the bracket. The guide rod 29 may have an integrally formed portion 32 (Fig. 3) of enlarged diameter adjacent the top. A spiral spring 37 is placed around the upper part of the guide rod between the portion 32 and the flange 23. While the shield 12, when displaced upwardly by rough terrain, will fall by gravity to the position shown in Figure 3, the spring 37 will aid the downward movement.

The stationary front shield 13 is, like the side shields, an armored body, secured by any suitable means, such as the rivets 33 (Figs. 1 and 4) to the front of the deck and then extended forwardly and downwardly along a curvilinear line intermediate the inner surfaces of the mud guards 34 and 35 and thence below the ends of the mud guards to a position adjacent the bottoms of the Caterpillar treads 14 and 15 (Fig. 4).

The side shields 11 and 12 may be effectively camouflaged, for example, by having painted thereon the Caterpillar treads and the means for operating them.

The operation of the tank will be apparent from the foregoing. Of course, the stationary front shield 13 could, like the vertically movable side shields, be made movable. However, since the tank can be operated forwardly or backwardly with equal facility, the stationary front shield offers no obstacle to the operation of the tank over rough terrain.

It will be appreciated that subject invention is in no way restricted to particular embodiments and that modifications may be considered and detailed improvements and the use of equivalents conceived without thereby departing from the scope of the invention. For example, the side shields may be used for other types of armored vehicles and they may be made stationary as well as movable.

What is claimed is:

1. In a military tank having Caterpillar treads on each side of an armored body and an upper deck with the sides thereof overhanging the treads; the improvements comprising a unitary adjustable side shield for the treads on each side of the body, each side shield having at least one inwardly directed flange adjacent each end, each flange having a vertically directed opening formed therein, a bracket disposed on the bottom of the overhanging deck adjacent each end, each bracket being turned outwardly at the bottom for the support of the inwardly directed flange when the side shield substantially covers the side of the treads and the upper edge is slidable above the corresponding upper edge of the overhanging deck, the bottom of each bracket having a vertically directed opening formed therein, a guide rod disposed through the overhanging deck and the opening in the bottom of each bracket and slidably inserted through the opening in the flange.

2. A military tank having Caterpillar treads on each side of an armored body and a deck overhanging the treads on the sides; the improvements comprising a unitary shield for the treads on each side of the body, a shoe disposed on the bottom of each shield adjacent each end and inwardly directed therefrom, means for securing each shield vertically movable over the edge of the overhanging deck and in outwardly spaced relationship with the treads, said means comprising a pair of vertically spaced and inwardly directed flanges disposed on the inner surface of each shield adjacent each end, each pair of flanges having vertically aligned openings formed therein, a bracket coacting with each pair of flanges disposed on the bottom of the deck, the bottom of each bracket being outwardly directed for the support of the lowermost flange, the top of each bracket being inwardly directed, means for securing the inwardly directed top of each bracket to the overhanging deck, a guide rod slidably disposed through each pair of aligned openings in the brackets and secured intermediate the outwardly directed bottom of each bracket and the overhanging deck, each guide rod having a portion of enlarged diameter in juxtaposition with the bottom surface of the overhanging deck, and a spiral spring disposed around each guide rod intermediate the portion of enlarged diameter and the uppermost flange.

References Cited in the file of this patent

UNITED STATES PATENTS

| | | |
|---|---|---|
| 1,287,845 | Bidwell | Dec. 17, 1918 |
| 1,318,189 | Tritton | Oct. 7, 1919 |
| 2,200,230 | Hojnowski | May 7, 1940 |
| 2,376,720 | Pflager | May 22, 1945 |
| 2,625,859 | Dandini | Jan. 20, 1953 |